1/29/85 OR 4,496,219

United States Patent [19]

Altman

[11] Patent Number: 4,496,219

[45] Date of Patent: Jan. 29, 1985

[54] BINARY DRIVE CIRCUITRY FOR MATRIX-ADDRESSED LIQUID CRYSTAL DISPLAY

[75] Inventor: Ted N. Altman, East Windsor, N.J.

[73] Assignee: RCA Corporation, New York, N.Y.

[21] Appl. No.: 432,780

[22] Filed: Oct. 4, 1982

[51] Int. Cl.[3] .................................................. G02F 1/13

[52] U.S. Cl. .................................................. 350/332

[58] Field of Search .................................. 350/332, 333

[56] References Cited

U.S. PATENT DOCUMENTS

| | | | |
|---|---|---|---|
| 3,740,717 | 6/1973 | Huener et al. | 340/166 EL |
| 3,911,421 | 10/1975 | Alt et al. | 340/124 M |
| 4,045,791 | 8/1977 | Fukai et al. | 340/324 M |
| 4,079,369 | 3/1978 | Fukumoto | 340/324 M |
| 4,116,543 | 9/1978 | Stein | 350/333 |
| 4,236,155 | 11/1980 | Nagata | 340/784 |

*Primary Examiner*—John K. Corbin
*Assistant Examiner*—Richard Gallivan
*Attorney, Agent, or Firm*—Joseph S. Tripoli; George E. Haas; Allen LeRoy Limberg

[57] ABSTRACT

Matrix-addressing circuitry for a liquid crystal display using a square-wave potential of first and second opposed phasings and its second harmonic as address voltages, avoiding the need for multi-level address voltages.

An appendix of this specification contains a program listing to which a claim of copyright is made. The copyright owner, assignee hereof, hereby licenses the duplication of the patent drawing, but reserves all other copyright rights whatsoever.

5 Claims, 10 Drawing Figures

COPYRIGHT RCA CORP. 1982

```
                        .TITLE LCDTST,'LCD TESTER'
              ;************************************************************
              ;                LCD TESTER
              ;TESTS 2 LEVEL LCD DRIVE METHOD.
              ;************************************************************
              ;************************************************************
              ;                RAM ASSIGNMENTS
              ;************************************************************
              ;
              ;
              ;
     000B               SEG=0B                  ;CONTAINS L7-L4 OR L3-L0
     000C               CTR1=0C                 ;CTR FOR DELAY IN STRTEST
     000D               LAST=0D                 ;BINARY CODE FOR MOST RECENT DI
                                                ;READ FROM KEYBOARD.
              ;
              ;
              ;
              ;
              ;
     001B               FLAG=01B                ;BIT0=SEG,INDICATES IF DIGIT 0
                                                ;DIGIT 1 IS BEING DISPLAYED.
     001C               CTR2=01C                ;CTR FOR DELAY IN STRTEST
     001D               DIG0=01D                ;BINARY CODE FOR DIGIT 0
              ;
              ;
              ;
              ;
              ;
              ;
     002C               STR=02C                 ;TESTED IN STRTEST
                                                ;0=KEY PRESSED,1=KEY NOT PRESSE
     002D               DIG1=02D                ;BINARY CODE FOR DIGIT1
              ;
              ;
              ;
              ;
              ;
              ;
              ;
              ;
              ;
              ;
              ;
              ;************************************************************
              ;
              ;
              ;************************************************************
              ;                MAIN PROGRAM
              ;************************************************************
```

*Fig. 4a*

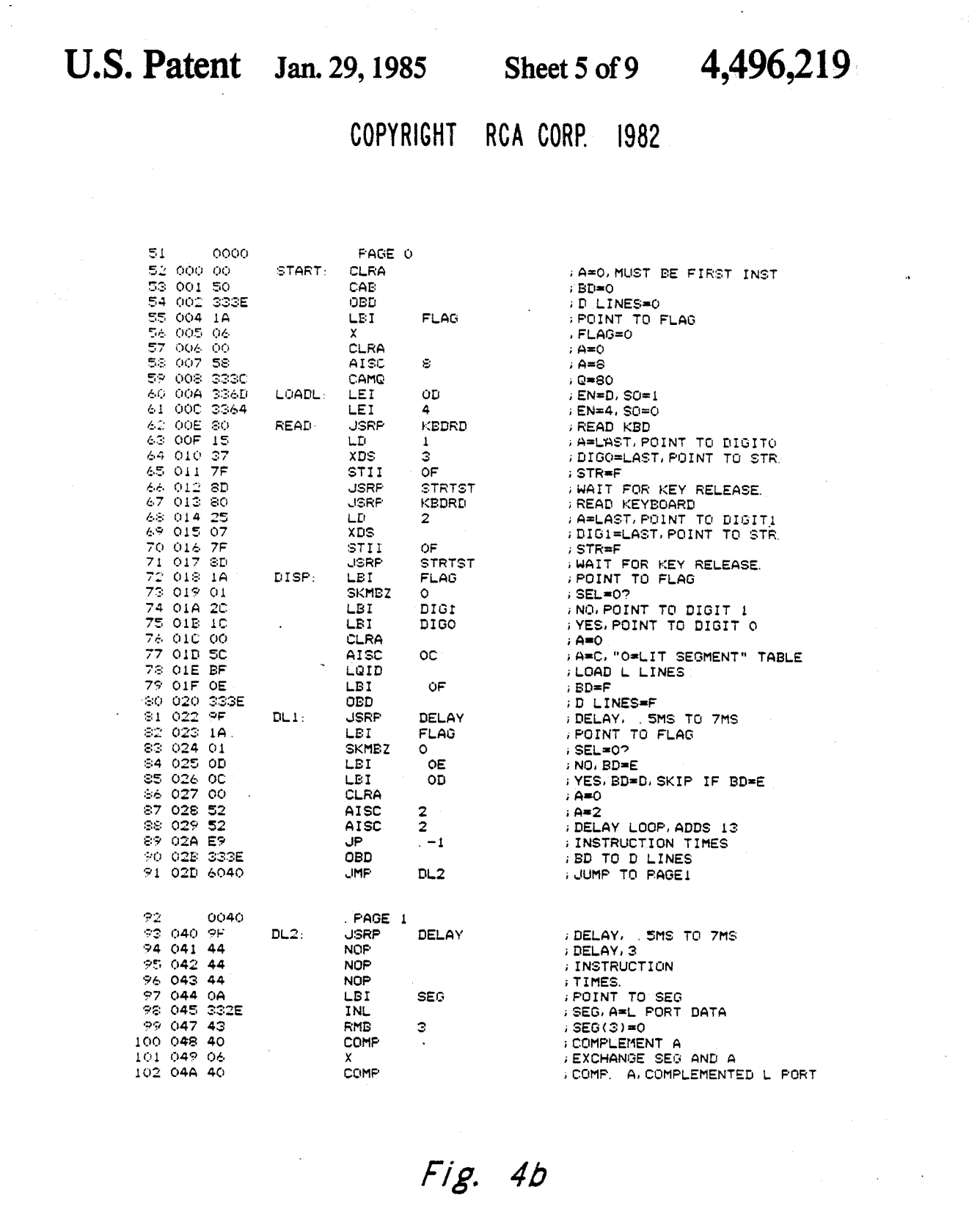

COPYRIGHT RCA CORP. 1982

```
    0000                PAGE 0
000 00      START:    CLRA                  ;A=0,MUST BE FIRST INST
001 50                CAB                   ;BD=0
002 333E              OBD                   ;D LINES=0
004 1A                LBI     FLAG          ;POINT TO FLAG
005 06                X                     ,FLAG=0
006 00                CLRA                  ;A=0
007 58                AISC    8             ;A=8
008 333C              CAMQ                  ;Q=80
00A 336D    LOADL:    LEI     OD            ;EN=D,SO=1
00C 3364              LEI     4             ;EN=4,SO=0
00E 80      READ      JSRP    KBDRD         ;READ KBD
00F 15                LD      1             ;A=LAST,POINT TO DIGITO
010 37                XDS     3             ;DIGO=LAST,POINT TO STR.
011 7F                STII    OF            ;STR=F
012 8D                JSRP    STRTST        ;WAIT FOR KEY RELEASE.
013 80                JSRP    KBDRD         ;READ KEYBOARD
014 25                LD      2             ;A=LAST,POINT TO DIGIT1
015 07                XDS                   ;DIG1=LAST,POINT TO STR.
016 7F                STII    OF            ;STR=F
017 8D                JSRP    STRTST        ;WAIT FOR KEY RELEASE.
018 1A      DISP:     LBI     FLAG          ;POINT TO FLAG
019 01                SKMBZ   0             ;SEL=0?
01A 2C                LBI     DIG1          ;NO,POINT TO DIGIT 1
01B 1C                LBI     DIGO          ;YES,POINT TO DIGIT 0
01C 00                CLRA                  ;A=0
01D 5C                AISC    OC            ;A=C,"0=LIT SEGMENT" TABLE
01E BF                LQID                  ;LOAD L LINES
01F 0E                LBI     OF            ;BD=F
020 333E              OBD                   ;D LINES=F
022 9F      DL1:      JSRP    DELAY         ;DELAY, .5MS TO 7MS
023 1A                LBI     FLAG          ;POINT TO FLAG
024 01                SKMBZ   0             ;SEL=0?
025 0D                LBI     OE            ;NO,BD=E
026 0C                LBI     OD            ;YES,BD=D,SKIP IF BD=E
027 00                CLRA                  ;A=0
028 52                AISC    2             ;A=2
029 52                AISC    2             ;DELAY LOOP,ADDS 13
02A E9                JP      .-1           ;INSTRUCTION TIMES
02B 333E              OBD                   ;BD TO D LINES
02D 6040              JMP     DL2           ;JUMP TO PAGE1

    0040                .PAGE 1
040 9F      DL2:      JSRP    DELAY         ;DELAY, .5MS TO 7MS
041 44                NOP                   ;DELAY,3
042 44                NOP                   ;INSTRUCTION
043 44                NOP                   ;TIMES.
044 0A                LBI     SEG           ;POINT TO SEG
045 332E              INL                   ;SEG,A=L PORT DATA
047 43                RMB     3             ;SEG(3)=0
048 40                COMP                  ;COMPLEMENT A
049 06                X                     ;EXCHANGE SEG AND A
04A 40                COMP                  ;COMP. A,COMPLEMENTED L PORT
```

*Fig. 4b*

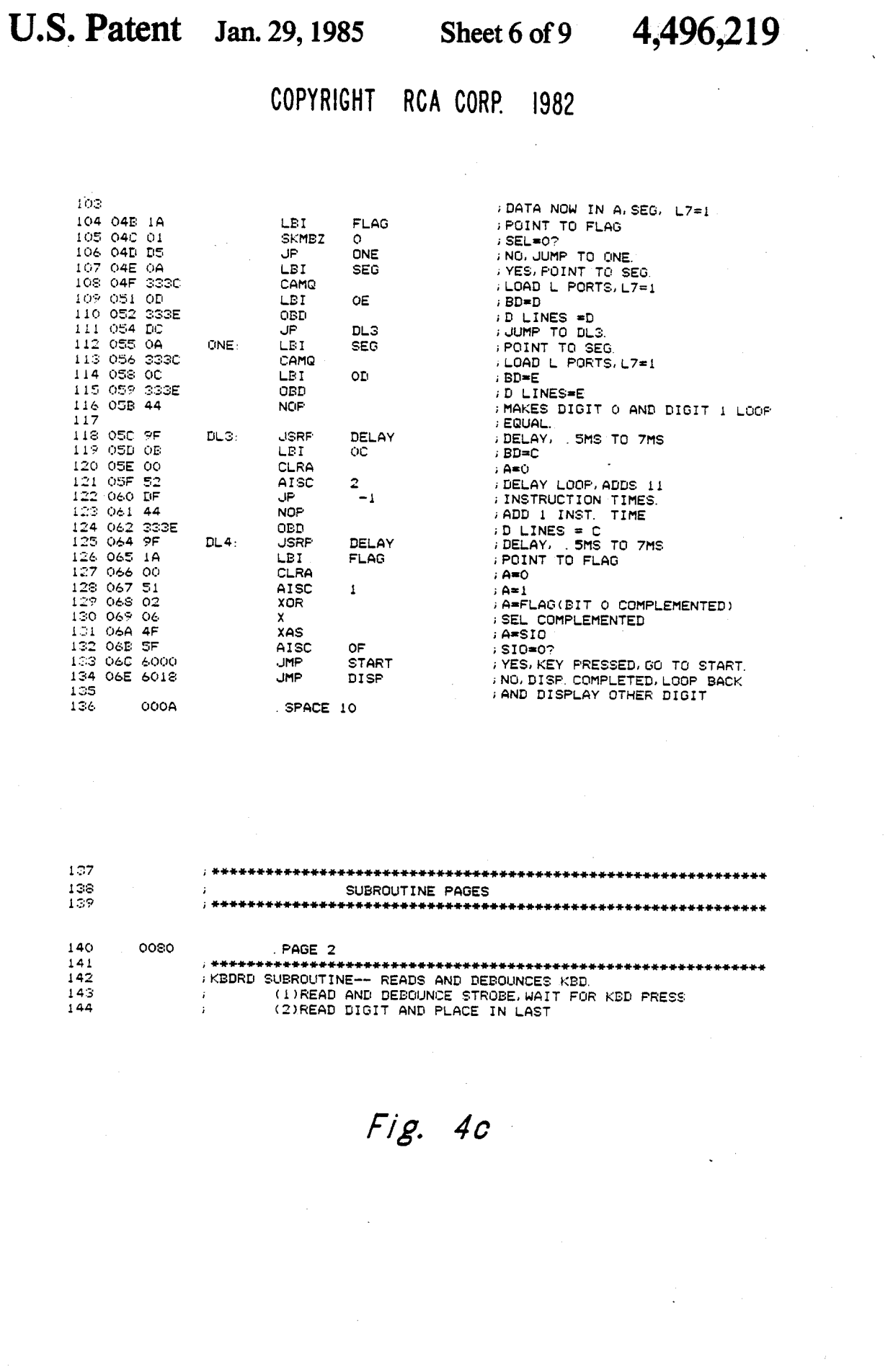

COPYRIGHT RCA CORP. 1982

```
                                         ;DATA NOW IN A,SEG, L7=1
04B 1A            LBI     FLAG           ;POINT TO FLAG
04C 01            SKMBZ   0              ;SEL=0?
04D D5            JP      ONE            ;NO,JUMP TO ONE.
04E 0A            LBI     SEG            ;YES,POINT TO SEG.
04F 333C          CAMQ                   ;LOAD L PORTS,L7=1
051 0D            LBI     0E             ;BD=D
052 333E          OBD                    ;D LINES =D
054 DC            JP      DL3            ;JUMP TO DL3.
055 0A      ONE:  LBI     SEG            ;POINT TO SEG.
056 333C          CAMQ                   ;LOAD L PORTS,L7=1
058 0C            LBI     0D             ;BD=E
059 333E          OBD                    ;D LINES=E
05B 44            NOP                    ;MAKES DIGIT 0 AND DIGIT 1 LOOP
                                         ;EQUAL.
05C 9F      DL3:  JSRP    DELAY          ;DELAY, .5MS TO 7MS
05D 0B            LBI     0C             ;BD=C
05E 00            CLRA                   ;A=0
05F 52            AISC    2              ;DELAY LOOP,ADDS 11
060 DF            JP      -1             ;INSTRUCTION TIMES.
061 44            NOP                    ;ADD 1 INST. TIME
062 333E          OBD                    ;D LINES = C
064 9F      DL4:  JSRP    DELAY          ;DELAY, .5MS TO 7MS
065 1A            LBI     FLAG           ;POINT TO FLAG
066 00            CLRA                   ;A=0
067 51            AISC    1              ;A=1
068 02            XOR                    ;A=FLAG(BIT 0 COMPLEMENTED)
069 06            X                      ;SEL COMPLEMENTED
06A 4F            XAS                    ;A=SIO
06B 5F            AISC    0F             ;SIO=0?
06C 6000          JMP     START          ;YES,KEY PRESSED,GO TO START.
06E 6018          JMP     DISP           ;NO,DISP. COMPLETED,LOOP BACK
                                         ;AND DISPLAY OTHER DIGIT
    000A          .SPACE 10


            ;****************************************************************
            ;                    SUBROUTINE PAGES
            ;****************************************************************

    0080          .PAGE 2
            ;****************************************************************
            ;KBDRD SUBROUTINE-- READS AND DEBOUNCES KBD.
            ;        (1)READ AND DEBOUNCE STROBE,WAIT FOR KBD PRESS
            ;        (2)READ DIGIT AND PLACE IN LAST
```

*Fig. 4c*

COPYRIGHT RCA CORP. 1982

```
                ;         (3)EXIT POINTING TO LAST
                ;*************************************************************
                ;
080 2B          KBDRD:  LBI     STR             ;POINT TO STR
081 7F                  STII    OF              ;STR=F
082 2B                  LBI     STR             ;POINT TO STR
083 333A                OMG                     ;G LINES=F
085 70                  STII    0               ;STR=0
086 688D                JSR     STRTST          ;WAIT FOR KEY PRESS
088 332A                ING                     ;KBD TO A
08A 0C                  LBI     LAST            ;POINT TO LAST
08B 06                  X                       ;KBD TO LAST
08C 48                  RET                     ;EXIT SUBROUTINE
    0005                 SPACE 5
```

```
                ;*************************************************************
                ;          STRTST SUBROUTINE--TESTS AND DEBOUNCES KBD STROBE
                ;STROBE MUST REMAIN IN SAME STATE FOR 15MS BEFORE BEING ACCEPTE
                ;*************************************************************
08D 00          STRTST: CLRA                    ;A=0
08E 0B                  LBI     CTR1            ;POINT TO CTR1
08F 16                  X       1               ;0 TO CTR1, POINT TO CTR2
090 00                  CLRA                    ;A=0
091 36          RDST:   X       3               ;LOAD CTR2, POINT TO STR
092 4F                  XAS                     ;A=SIO
093 21                  SKE                     ;SIO=STR?
094 8D                  JP      STRTST          ;NO, LOOP
095 0B                  LBI     CTR1            ;YES, POINT TO CTR1
096 22                  SC                      ;C=1
097 00                  CLRA                    ;A=0
098 30                  ASC                     ;A=CTR1+1, C=CARRY
099 44                  NOP                     ;
09A 16                  X       1               ;CTR1 INCREMENTED, POINT TO CTR2
09B 00                  CLRA                    ;A=0
09C 30                  ASC                     ;A=CTR2+C, CARRY?
09D 91                  JP      RDST            ;NO, LOOP
09E 48                  RET                     ;YES, EXIT SUBROUTINE
    0005                 SPACE 5
```

```
                ;*************************************************************
                ;         DELAY SUBROUTINE--PROVIDES .5MS TO 7MS VARIABLE DELAY
                ;PROVIDES POSITIVE GOING TRIGGER FOR ONE SHOT ON SO AND WAITS F
                ;ONE SHOT OUTPUT (IN2) TO GO POSITIVE.
                ;EXITS POINTING TO SEG.
                ;*************************************************************
09F 336D        DELAY:  LEI     OD              ;SO=1
```

*Fig. 4d*

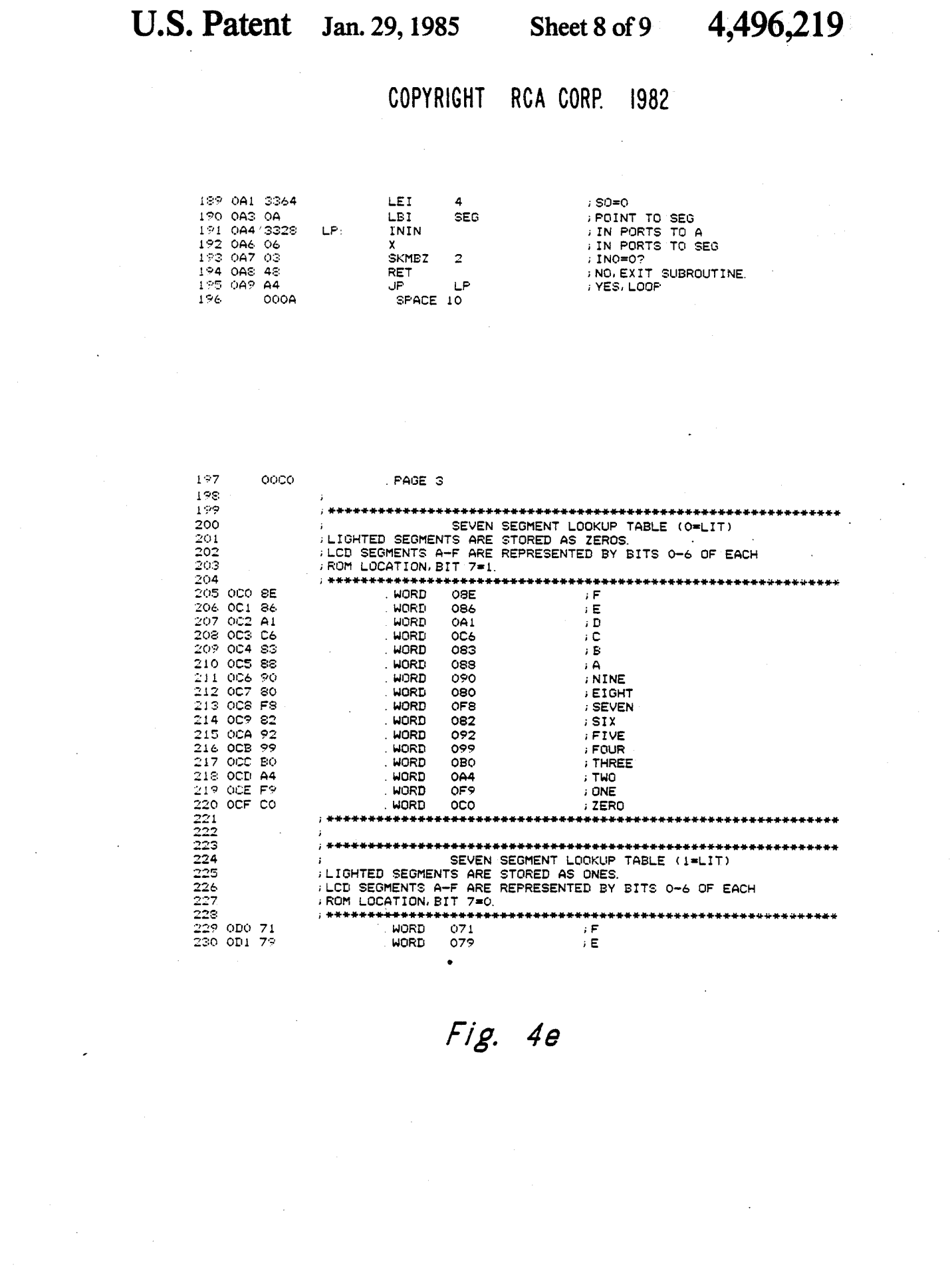

COPYRIGHT RCA CORP. 1982

```
0A1 3364          LEI     4           ;SO=0
0A3 0A            LBI     SEG         ;POINT TO SEG
0A4 3328   LP:    ININ                ;IN PORTS TO A
0A6 06            X                   ;IN PORTS TO SEG
0A7 03            SKMBZ   2           ;IN0=0?
0A8 48            RET                 ;NO,EXIT SUBROUTINE.
0A9 A4            JP      LP          ;YES,LOOP
    000A           SPACE 10
```

```
    00C0          .PAGE 3
           ;
           ;*************************************************************
           ;              SEVEN SEGMENT LOOKUP TABLE (0=LIT)
           ;LIGHTED SEGMENTS ARE STORED AS ZEROS.
           ;LCD SEGMENTS A-F ARE REPRESENTED BY BITS 0-6 OF EACH
           ;ROM LOCATION,BIT 7=1.
           ;*************************************************************
0C0 8E            .WORD   08E         ;F
0C1 86            .WORD   086         ;E
0C2 A1            .WORD   0A1         ;D
0C3 C6            .WORD   0C6         ;C
0C4 83            .WORD   083         ;B
0C5 88            .WORD   088         ;A
0C6 90            .WORD   090         ;NINE
0C7 80            .WORD   080         ;EIGHT
0C8 F8            .WORD   0F8         ;SEVEN
0C9 82            .WORD   082         ;SIX
0CA 92            .WORD   092         ;FIVE
0CB 99            .WORD   099         ;FOUR
0CC B0            .WORD   0B0         ;THREE
0CD A4            .WORD   0A4         ;TWO
0CE F9            .WORD   0F9         ;ONE
0CF C0            .WORD   0C0         ;ZERO
           ;*************************************************************
           ;
           ;*************************************************************
           ;              SEVEN SEGMENT LOOKUP TABLE (1=LIT)
           ;LIGHTED SEGMENTS ARE STORED AS ONES.
           ;LCD SEGMENTS A-F ARE REPRESENTED BY BITS 0-6 OF EACH
           ;ROM LOCATION,BIT 7=0.
           ;*************************************************************
0D0 71            .WORD   071         ;F
0D1 79            .WORD   079         ;E
```

*Fig. 4e*

COPYRIGHT RCA CORP. 1982

```
OD2 5E        .WORD   05E        ;D
OD3 39        .WORD   039        ;C
OD4 7C        .WORD   07C        ;B
OD5 77        .WORD   077        ;A
OD6 6F        .WORD   06F        ;9
OD7 7F        .WORD   07F        ;8
OD8 07        .WORD   007        ;7
OD9 7D        .WORD   07D        ;6
ODA 6D        .WORD   06D        ;5
ODB 66        .WORD   066        ;4
ODC 4F        .WORD   04F        ;3
ODD 5B        .WORD   05B        ;2
ODE 06        .WORD   006        ;1
ODF 3F        .WORD   03F        ;0
          ;*****************************************************************
              .END
```

*Fig. 4f*

| | | | | | | | | | | | |
|---|---|---|---|---|---|---|---|---|---|---|---|
| CTR1 | 000C | | CTR2 | 001C | * | DELAY | 009F | | DIG0 | 001D | |
| DIG1 | 002D | | DISP | 0018 | | DL1 | 0022 | * | DL2 | 0040 | |
| DL3 | 005C | | DL4 | 0064 | * | FLAG | 001B | | KBDRD | 0080 | |
| LAST | 000D | | LOADL | 000A | * | LP | 00A4 | | ONE | 0055 | |
| RDST | 0091 | | READ | 000E | * | SEG | 000B | | START | 0000 | |
| STR | 002C | | STRTST | 008D | | | | | | | |

NO ERROR LINES

169 ROM WORDS USED

COP 420 ASSEMBLY

SOURCE CHECKSUM = 0012

INPUT FILE SCHM1:LCDTST.SRC VN: 22

*Fig. 4g*

BINARY DRIVE CIRCUITRY FOR MATRIX-ADDRESSED LIQUID CRYSTAL DISPLAY

BACKGROUND OF THE INVENTION

The present invention relates to drive circuitry for matrix-addressed liquid crystal display (LCD) devices of the type responsive to the RMS levels of applied voltages.

LCD devices of the twisted-nematic type are used for displaying in seven-segment form selected ones of the decimal digits, for example. The twisted-nematic liquid crystal material is contained between parallel optical plates, one a linear polarizer and the other a linear analyzer. Without electric field, or potential gradient, applied in a direction normal to the plates, the twisted-nematic liquid crystal acts as a quarter-wave plate rotating polarization $\pi/2$ radians. Transparent electrodes on the inside surfaces of the confining plates are used to selectively apply electric field normal to those surfaces, responsive to which the twisted-nematic liquid crystal no longer rotates polarization. If the polarizer and analyzer are parallel-polarized, light transmission and absorption are respectively associated with application and non-application of electric field. If the polarizer and analyzer are cross-polarized, light absorption and transmission are respectively associated with application and non-application of electric field. A mirror may be used to back the analyzer to make the display device reflective rather than transmissive at the locations light absorption does not take place.

Conventional programmable LCD displays of the twisted-nematic type have a common or "back-plane" electrode for all portions of the display on one of the containing surfaces and a plurality of electrodes on the opposing containing surface, which segment "front-plane" electrodes can be selectively addressed with signal voltages to cause potential gradients, or electrical fields, between the common electrode and them. (It is possible to have the common electrode on the viewed surface of the LCD display and the segmented electrodes on the non-viewed surface, of course.) Such single-dimensional addressing undesirably requires as many address lines as programmable display segments.

Where the display comprises iterated display modules of information—e.g., where it is an array of programmable seven-segment decimal numerals—the number of address lines can be reduced by using two-dimensional, or matrix, addressing. The common or back-plane electrode is divided into one electrode per display module and corresponding segments opposing each module are parallelly addressed. An even number, 2n, of address lines can then select one from $n^2$ display locations on a time-division-multiplexed basis, as compared to one from 2n display locations for single-dimensional addressing.

To maintain long lifetime of the twisted-nematic liquid crystal material it is desirable to avoid the applied electric field having a sustained direct component. This has led to the address lines in at least one of the dimensions used for matrix addressing being arranged to receive a ternary drive signal in prior art matrix addressing schemes. It is desirable to have a matrix-addressing scheme requiring only binary drive signals, to facilitate interfacing with conventional digital circuitry, such as a microprocessor, however.

SUMMARY OF THE INVENTION

The invention is embodied in multiplexed LCD drive circuitry operating with two drive levels on address lines to the LCD devices, rather than the three drive levels used in the prior art. The LCD devices are of the type sensitive to the RMS level of the potential gradient across the liquid crystal. The common electrode of the display module selected during time-division multiplexing is driven with a square wave of predetermined amplitude and of a first phasing of a first frequency. The common electrode of each non-selected display module is driven with a square wave of the predetermined amplitude and of a second frequency which is an even-harmonic of the first frequency. The address lines connecting corresponding segments of the display modules are driven either by the square wave of predetermined amplitude and the first phasing of the first frequency, or by a square wave of like amplitude but of a second passing of the first frequency opposite the first phasing, depending on whether the segment in the selected display module on that address line is not to have or is to have electric field between it and the common electrode of the selected display module.

Figure 1:
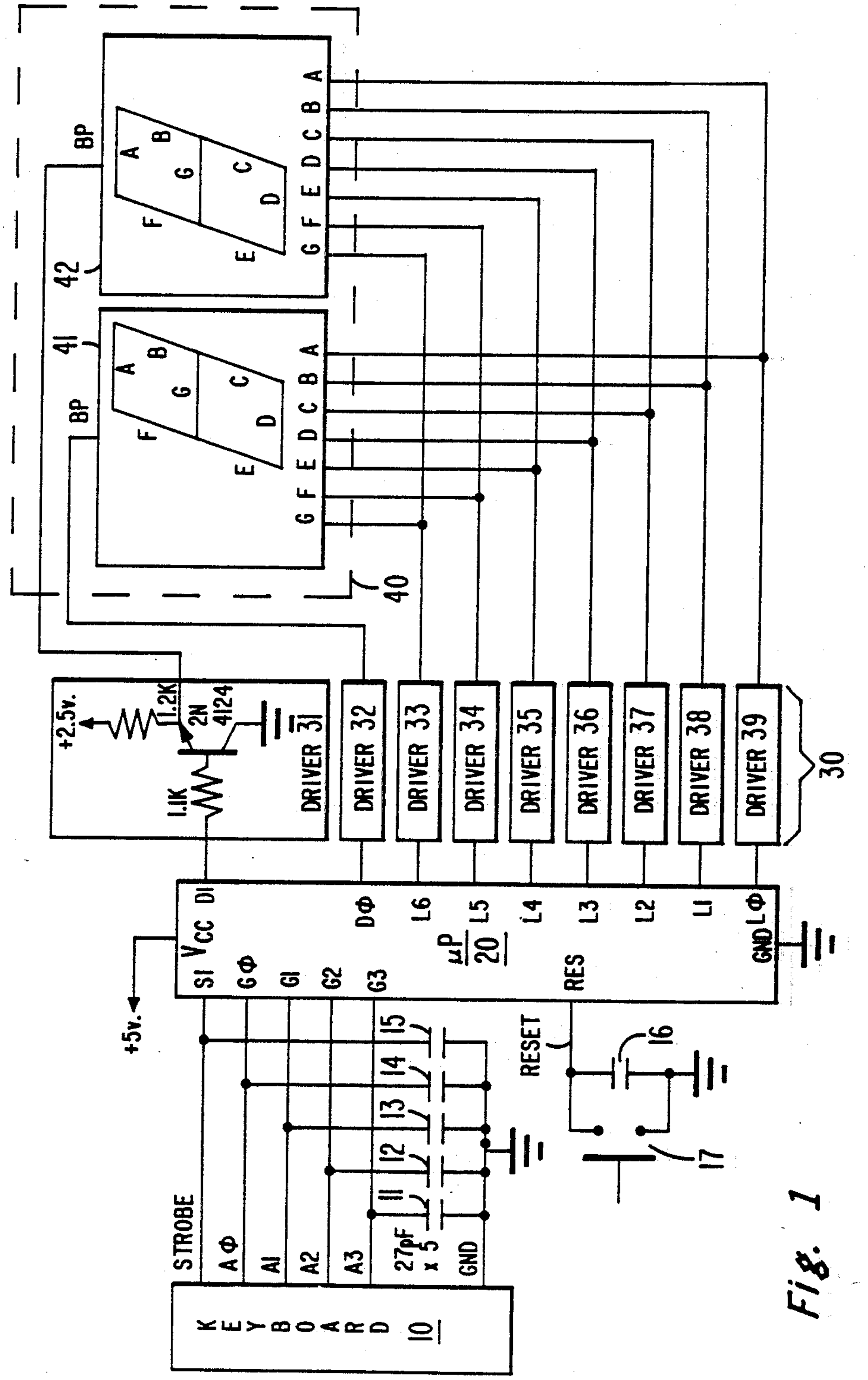
FIG. 1 is a schematic diagram of circuitry for addressing two seven-segment numeral LCD display devices in accordance with the invention.

An appendix to this application, seven pages in length contains a program listing for the FIG. 1 microprocessor.

DETAILED DESCRIPTION OF THE PREFERRED EMBODIMENTS

In FIG. 1 a keyboard 10 supplies inverted binary code and a strobe pulse responsive to each of its key being depressed to the input of a microprocessor 20 (such as the COP 410L made by National Semiconductor Corporation, 2900 Semiconductor Drive, Santa Clara, Calif. 95051), which microprocessor generates the complements of the drive signal waveforms applied to an LCD display 40. A set 30 of drivers 31, 32, 33, 34, 35, 36, 37, 38 and 39 buffers microprocessor 20 display driver outputs and display 40 comprising two seven-segment numeric indicators 41 and 42. Numeral 41 and 42 have respective back-plane (BP) common electrodes driven from drivers 32 and 31, respectively; and they each have G, F, E, D, C, B and A front-plate segment electrodes driven from devices 33, 34, 35, 36, 37, 38 and 39, respectively.

The specific construction of these drivers is illustrated in the confines of driver 31; they use 2N124 transistors connected in the inverse mode to give a $V_{CE\text{-}SAT}$ of less than 10 mV to avoid direct current being applied to the LCD devices in display 40. The unmarked output connection of microprocessor 20 to drive 31 would, in the case of a CDP410L, be its D1 output connection. The microprocessor 20 is not used to drive the LCD devices directly, because the COP 410L has 35-40 mV difference in nominally alike output voltages. This was not within the 25 mV maximum direct voltage tolerance of the LCD devices used. (One digit of each of a pair of FE0202 four-digit, seven-segment numeral displays made by AND of the William J. Purdy Company group, 770 Airport Blvd., Burlingame, Calif. 94010, were used in testing the invention; two were required because all four digits in each device share a common back-plane electrode.) If a microprocessor with sufficiently tight clamp to ground during logic ZERO output were to become available (this being within the present capability of i-c design art), it should be possible to eliminate the set 30 of driver amplifiers and drive the LCD devices directly from microprocessor 20.

Capacitors 11, 12, 13, 14, 15 and 16 are used for debouncing responses to keyboard 10 switches or a reset switch 17 being closed. After two digits have been entered by touching switches on keyboard 10, the selected digits will be displayed left to right in order of entry on display 40 until such time as normally-open reset switch 17 is momentarily closed.

Figure 2:
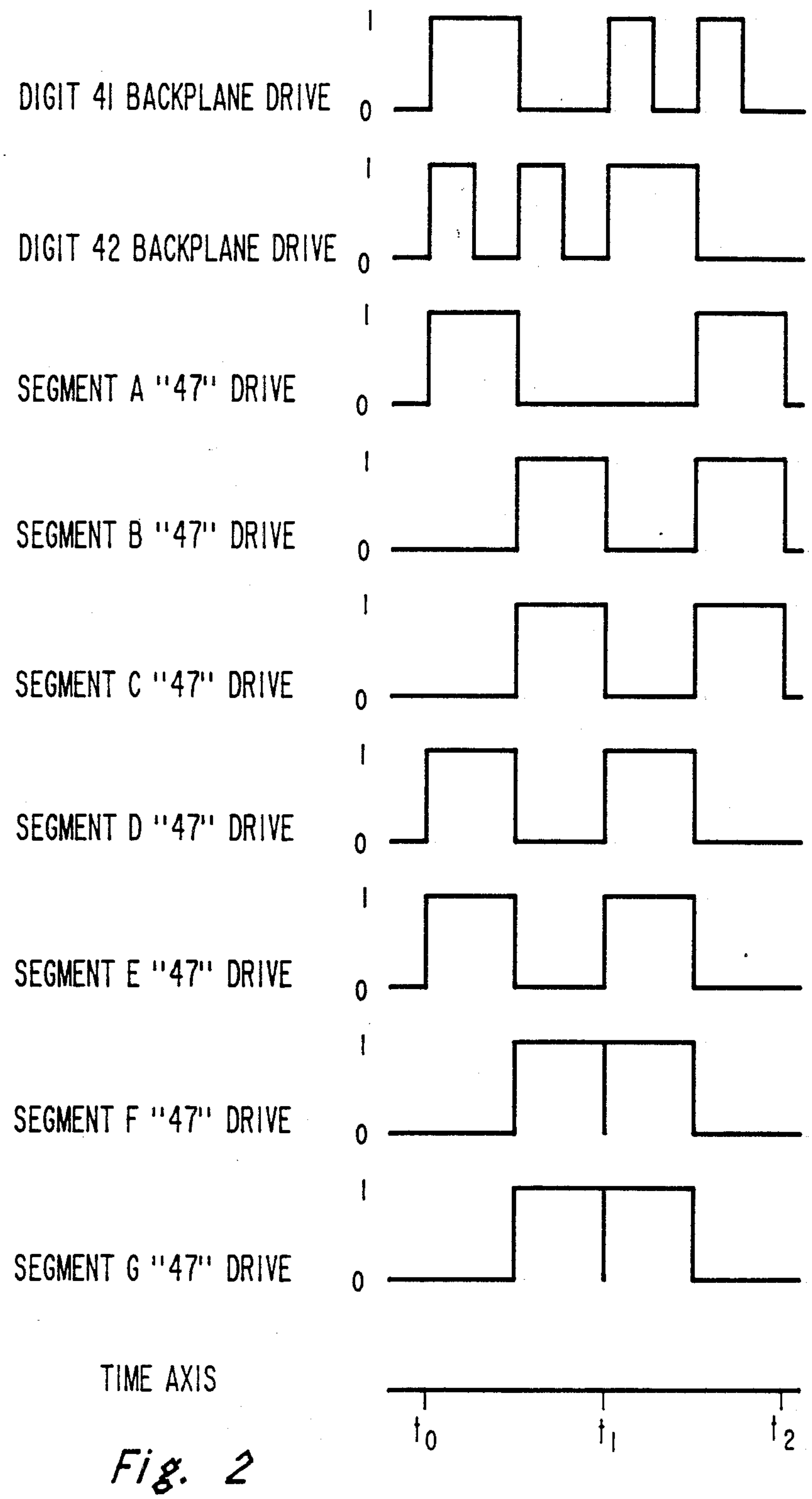
FIG. 2 is a timing diagram showing binary signal drives to the FIG. 1 LCD devices when they are to display the number forty-seven.

FIG. 2 shows the driver 31-39 output voltage waveforms generated in response to output signals from microprocessor 20, when LCD devices 41 and 42 are to display the decimal digits for forty-seven. The waveforms from time $t_0$ to time $t_2$ in practice are recurrent waveforms, repeating themselves. A program listing for generating such waveforms in microprocessor 20 being a COP 402 emulator for the COP 410L has seven pages appearing respectively as FIGS. 4(*a*), 4(*b*), 4(*c*), 4(*e*), 4(*f*) and 4(*g*) of the drawing. Listing is in COP 420 machine language followed by its assembly language and then by comments. (The program is short enough to fit in the memory of the COP 410L microprocessor, which microprocessor is the same as the COP 420 except for having less memory). From FIG. 2 one will discern the nature of the waveforms which have to be generated for matrix-addressing an LCD array according to the present invention, whether these waveforms are generated per FIG. 1 by microprocessor 20 using appropriate software or per FIG. 3 by equivalent hardware. The waveforms of FIG. 2 are binary, having either logic ZERO value (here "ground") or logic ONE value (here +2.5 v).

During the time between $t_0$ and $t_1$ the LCD device 41 is to be written. Accordingly its common electrode receives a square-wave potential of a predetermined amplitude (the voltage spanning between logic ZERO AND logic ONE) and of a first phasing of a first frequency. LCD device 42, which is not to be written, is supplied at its common electrode with a square-wave potential of the same amplitude. However, this square-wave potential is of a second frequency, the second harmonic of the first frequency, although another even harmonic of the first frequency could instead be used.

In the interval from $t_0$ to $t_1$ the digit four is to be presented by numeric indicator 41. So there should be electric field between each of the electrodes associated respectively with segments F, G, B and C and the common or back-plane electrode of device 41. This is arranged for by applying square-wave potential of the first frequency, opposite the first phasing, to the electrodes associated with segments F, G, B and C. There should be as little electric field as possible between each of the electrodes associated respectively with segments A, E and D and the common electrode of device 41. This is arranged for by applying square-wave potential of the predetermined amplitude and of the first phasing of the first frequency to these electrodes.

During the time between $t_1$ and $t_2$ the LCD device 42 is to be written and its common electrode accordingly receives a square-wave potential of the predetermined amplitude in the first phasing of the first frequency. LCD device 41, which is not to be written, has applied to its common electrode a square-wave potential of the predetermined amplitude and of the second frequency, which is an even harmonic of the first frequency. The digit seven is to be presented, so in device 42 there is to be electric field between the common electrode and each of the electrodes associated with the segments A, B and C. Accordingly, a square-wave potential of the predetermined amplitude and of a second phasing of the first frequency, opposite to the first phasing, is applied to the electrodes associated with these segments. A square-wave potential of the predetermined amplitude and of the first phasing of the first frequency is applied to the electrodes associated with the other segments, so there is no electric field between these electrodes and the common electrode of device 42.

The basic difference between the matrix-addressing scheme illustrated in FIG. 2 and the conventional half-voltage selection method is that the back-plane electrode of the non-selected display module is driven with square-wave potential of frequency twice that of the square-wave potential used to drive the back-plane electrode of the selected display module. This, instead of being driven with a direct potential equal to the average of the square-wave potential used to drive the back-plane electrode of the selected display module.

The figure of merit for a multiplexing method of addressing an LCD is the ratio $(V_{ss}/V_{ns})$ of the RMS voltage applied between the backplate and a selected segment to the RMS voltage applied between the backplate and a non-selected segment, over an interval in which each of the N display modules is selected for an equal amount of time. It is important to maximize this ratio owing to the non-abruptness in the voltage threshold for optical transmissivity in the liquid crystal materials, and the minimum acceptable value of this ratio is nominally $2^{(\frac{1}{2})}$. The theoretical maximum value of $(V_{ss}/V_{ns})$ is $[(N^{\frac{1}{2}}+1)/(N^{(\frac{1}{2})}-1)]^{(\frac{1}{2})}$, where N is the number of display modules being multiplexed between or amongst. This value is achievable only by using drive voltages of five or more levels. With the half-voltage selection technique $(V_{ss}/V_{ns})$ equals $[(N+3)/(N-1)]^{(\frac{1}{2})}$.

The new matrix-addressing technique with binary signals has a $V_{ss}/V_{ns}$ of only $[(N+1)/(N-1)]^{(\frac{1}{2})}$. This means that with present liquid crystal materials it is best to multiplex only two or three display modules using the new matrix addressing scheme. Nonetheless, the invention is attractive in many applications, since it avoids the need for multi-level drive voltages so digital circuitry using normal binary logic can be used to drive the LCD devices directly, while reducing the number of drive voltage nearly one-half or two-thirds over non-multiplexed displays. There is no need to develop accurate intermediate supply voltages between square-wave voltage extremes of excursion as in the prior art half-voltage and third-voltage matrix addressing schemes.

Thusfar, the invention has been described in terms of the selected LCD module receiving at its backplane a binary-valued module-selection voltage F(t) that is a square wave and the non-selected LCD module receiving at its backplane a binary-valued module-deselection voltage G(t) that is a square-wave second harmonic to the module-selection square-wave voltage. The segments are driven either by F(t) or its logic complement $\overline{F}$)/. These square-wave signals are specific examples of a more general class of binary-valued F(t) and G(t) signals that can be used to implement the invention. They are preferred examples inasmuch as they are the least complex signals to generate.

Generally, F(t), may be any binary-valued signal which, over the time interval $\Delta t$ the module selection voltage is to be applied, is high half of the time interval $\Delta t$ and low the other half of the time interval $\Delta t$. This avoids direct current flow between backplane and selected or non-selected segments of the selected module. G(t) may be any binary-valued signal which over the time interval $\Delta t$ is high half the time F(t) is high, low half the time F(t) is high, high half the time F(t) is low, and low half the time F(t) is low. This avoids direct current flow between backplane and non-selected segments of the non-selected module to which F(t) is applied as segment voltage. Since G(t) as thus chosen must also be high half the time $\overline{F}$)/ is low, low half the time $\overline{F}$)/ is low, high half the time $\overline{F}$)/ is high, and low half the time $\overline{F}$)/ is high, this choice of G(t) also avoids direct current flow between backplane segments of the non-selected module corresponding to selected segments of the selected module.

The $V_{ss}$ for any of these F(t) and G(t) signals will be the same. It is unity for the $\Delta t$ time interval the selected segment of the selected module has F(t) and $\overline{F}$)/ on its electrodes, plus unity for half the time and zero the other half the time of (N−1) further $\Delta t$ time intervals when that segment has G(t) and F(t) or $\overline{F}$)/ on its electrodes, all divided by N number of $\Delta t$ time intervals, to obtain the mean value of voltage applied to the selected segment of the selected module, which is then square-rooted to obtain the RMS value $V_{ss}$ of the voltage appearing on a selected segment of the multiplexed LCD display. That is, $V_{ss}$ is $\{[1+(\frac{1}{2})(N-1)]/N\}^{(\frac{1}{2})}=[(N+1)/2N]^{(\frac{1}{2})}$.

The $V_{ns}$ for any of these F(t) and G(t) signals will be the same. It is zero for the $\Delta t$ time interval that a non-selected segment has F(t) on its electrodes, plus unity for half the time and zero the other half the time of (N−1) further $\Delta t$ time intervals when that segment has G(t) and F(t) of $\overline{F}$)/ in its electrodes, all divided by N number of $\Delta t$ time intervals, to obtain the mean value of the voltage applied to the non-selected segment of the selected module, which is then square rooted to obtain the RMS value $V_{ns}$. That is, $V_{ns}$ is $\{[0+(\frac{1}{2})(N-1)]/N\}^{(\frac{1}{2})}=[N-1)/2N]^{(\frac{1}{2})}$. The value of $V_{ss}/V_{ns}$ for any of these binary-valued F(t), G(t) signals for selectively addressing segments of a multiplexed LCD display is then $[(N+1)/2N]^{(\frac{1}{2})}/[N-1)2N^{(\frac{1}{2})}=[(N+1)/(N-1)]^{(\frac{1}{2})}$.

Figure 3:
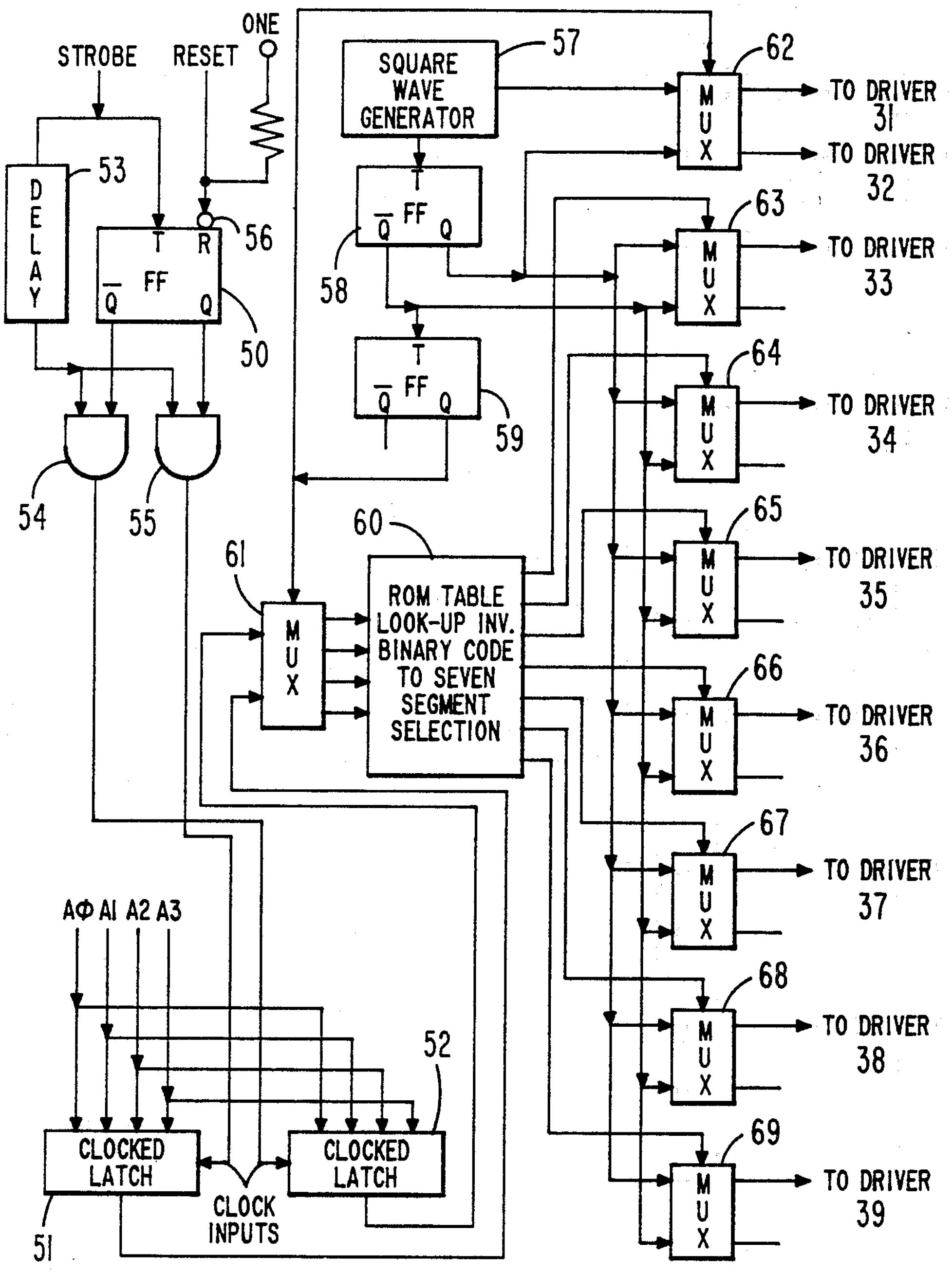
FIG. 3 is a schematic of hardware that may replace the microprocessor of FIG. 1 in another embodiment of the invention; and FIGS. *4a–4g* are a program listing for the microprocessor of FIG. 1.

FIG. 3 shows a hardware replacement for microprocessor 20 in FIG. 1. Inverse binary code words successively selected by keyboard 10 of FIG. 1 are stored in clocked latches 51 and 52, respectively. Each word has four bits supplied on AØ, A1, A2 and A3 lines, and is accompanied by a strobe pulse also from keyboard 10, which pulse is used to trigger a first triggerable flip-flop 50. Flip-flop 50 keeps count of which of latches 51 and 52 is to be clocked responsive to the strobe pulse. The strobe pulse is subjected to a delay 53 (provided, for example, by a cascade of even-numbered logic inverter stages) and applied to AND gates 54 and 55 for ANDing with respective ones of the complementary outputs of flip-flop 50 to generated clock input for latch 51 on even-numbered counts and for latch 52 on odd-numbered counts. A logic inverter 56 responds to reset signal (logic ZERO) applied from the reset switch of FIG. 1 to reset flip-flop 50 to even-numbered count.

A square-wave generator 57 generates square-wave potentials at the second frequency, which is the second harmonic of the first frequency. Square waves of the first frequency are generated in first and second phasings at the Q and $\overline{Q}$ outputs of a second triggerable flip-flop 58 triggered by generator 57 output square-wave potentials. A third triggerable flip-flop 59 is triggered by flip-flop 58 output to generate square-wave potentials to clock the multiplexing of the display devices 41 and 42 of FIG. 1.

A read-only memory 60, which may be a programmable type of ROM, stores the look-up table for converting inverse binary code to seven-segment drive information.

A square-wave output potential of flip-flop 59 is applied as control signal to multiplexer 61 to select which of the code words stored in clocked latches 51 and 52 is to be used as input to ROM 60. A square-wave output potential of flip-flop 59 is applied as control signal to multiplexer 62. This conditions multiplexer 62 to forward the first phasing, first frequency, square-wave output potential suppled to it from Q output of flip-flop 58 to the one of drivers 31 and 32 driving the selected one of devices 41 and 42. It also conditions multiplexer 62 to forward the second frequency, square-wave output potential supplied to it from square-wave generator 57 to the one of the drivers 31 and 32 driving the non-selected one of devices 41 and 42.

The output of ROM 60 is a seven-bit segment selection signal. The bits of this signal are supplied as control signals to respective ones of multiplexers 63, 64, 65, 66, 67, 68 and 69 used to select between first and second phasings of flip-flop 58 output for application to respective ones of drivers 33, 34, 35, 36, 37, 38 and 39. Each of the multiplexers 63-69 responds to a first of two logic conditions in its control signal to select the first phasing of the first frequency square-wave Q output of flip-flop 58 to supply to its associated driver the signal associated with non-selection of a segment; and it responds to the second of two logic conditions in its control signal to select the second phasing of the first frequency, square-wave potential from $\overline{Q}$ output of flip-flop 58 to be supplied to its associated driver as the signal associated with selection of a segment.

In the claims which follow, a half of a time interval may comprise discontinuous portions of the time interval. The square-wave signals called for in certain of the claims are to be assumed to be referred to the same average-value axis to avoid direct currents on the liquid crystal devices. While the claims specify field-effect mode LCD devices being used to implement the matrix addressing systems of the invention, the matrix addressing systems would have application to other matrix addressed devices responsive to RMS voltage level between address lines; and the claims should be broadly construed to include such equivalent uses of the invention within their scope.

What is claimed is:

1. A matrix-addressed liquid crystal display system including:

an electrically controlled liquid crystal display divided into modules, each module having a common electrode and a plurality of opposed segment electrodes between which potential gradients may be selectively established through the liquid crystal;

means for time-division-mulitplex addressing the common electrodes of said modules during sequential addressing intervals, including means for applying a first phase of square-wave signal of a predetermined amplitude and a first square-wave repetition rate to the common electrode of the selected one of said modules during each addressing interval;

means for parallelly addressing the segment electrodes of said modules with a second phase of square-wave signal of said predetermined amplitude and said first square-wave repetition rate during each of said addressing intervals, or with first phase of square-wave signal of said predetermined amplitude and first square-wave repetition rate, depending on whether or not the common electrode of a selected one of said modules is to have a field between it and the respective ones of those segment electrodes opposed to it, said first and second phases of said first square-wave repetition rate being opposite each other; and the improvement wherein said means for time-division-multiplex addressing the common electrodes of said modules during sequential addressing intervals also comprises:

means for applying to the common electrode of each non-selected one of said modules a square-wave signal of said predetermined amplitude, but of a second square-wave repetition rate which is an even harmonic of that applied to the common electrode of said selected module.

2. A matrix-addressed liquid crystal display system as set forth in claim 1 wherein said even harmonic is the second harmonic.

3. A method for deselecting a segment in a matrix-addressed liquid crystal display device which receives on the first of first and second opposing electrodes associated therewith a square-wave drive voltage of a predetermined amplitude and of a first frequency, said method comprising the step of:

applying on the second electrode a square-wave drive voltage of said predetermined amplitude and of a second frequency, which second frequency is an even harmonic of said first frequency.

4. A matrix-addressed liquid crystal display system including an electrically controlled liquid crystal display divided into modules, each module having a common electrode and a plurality of opposed segment electrodes between which potential gradients may be selectively established through the liquid crystal;

means for time-division-multiplex addressing the common electrodes of said modules during sequential addressing intervals;

means, included in said means for time-division-multiplex addressing, for applying a first binary-valued signal of a predetermined amplitude between high and low voltages to the common electrode of the selected one of said modules during each addressing interval, which first binary-valued signal is high during half the time of each addressing interval and otherwise low;

means, included in said means for time-division-multiplex addressing, for applying to the common electrode of each non-selected one of said modules a second binary-valued signal of said predetermined amplitude, between said high and said low voltages, which second binary-valued signal is at said high voltage half the time said first binary-valued signal is at said high voltage, is at said low voltage the other portion of the time said first binary-valued signal is at said high voltage, is at said low voltage half the time said first binary-valued signal is at said low voltage, and is at said high voltage the other portion of the time said first binary-valued signal is at said low voltage; and means for parallelly addressing the segment electrodes of said modules with the complement of said first binary-valued signal of said predetermined amplitude during each of said addressing intervals, or with said first binary-valued signal of said predetermined amplitude itself, depending on whether or not the common electrode of a selected one of said modules is to have a potential gradient between it and the respective ones of those segments electrodes opposed to it.

5. A method for deselecting a segment in a matrix-addressed liquid crystal display device which receives on the first of first and second opposing electrodes associated therewith a first binary-valued drive voltage of a relatively high value for half of a segment selection time interval and of a relatively low value for the remaining portion of that segment selection time interval, said method comprising the steps of:

applying on the second electrode a second binary-valued drive voltage, which is of said relatively high value half the time said first binary-valued signal is said relatively high value and half the time said first binary-valued signal is said relatively low value, and which is of said relatively low value half the time said first binary-valued signal is said relatively high value and half the time said first binary signal is said relatively low value.

* * * * *